(12) United States Patent
Lucky

(10) Patent No.: US 7,594,353 B2
(45) Date of Patent: Sep. 29, 2009

(54) FISHING ROD HOLDER

(75) Inventor: Dan Lucky, Ponte Vedra Beach, FL (US)

(73) Assignee: Fishing Rod Holder, LLC, Ponte Vedra Beach, FL (US)

(*) Notice: Subject to any disclaimer, the term of this patent is extended or adjusted under 35 U.S.C. 154(b) by 870 days.

(21) Appl. No.: 11/151,668

(22) Filed: Jun. 13, 2005

(65) Prior Publication Data

US 2006/0277814 A1    Dec. 14, 2006

(51) Int. Cl.
*A01K 97/10* (2006.01)
(52) U.S. Cl. .................. 43/21.2; 211/70.8; 248/512; 248/519; 248/539
(58) Field of Classification Search ............... 43/21.2; 211/70.8; 248/512, 513, 519, 520, 523, 538, 248/539
See application file for complete search history.

(56) References Cited

U.S. PATENT DOCUMENTS

| | | | |
|---|---|---|---|
| 2,740,546 A | 4/1956 | Kowalski | |
| 3,571,964 A | 3/1971 | Bogathy | 43/21.2 |
| 3,603,019 A | 9/1971 | Smeltzer | 43/21.2 |
| 3,659,369 A * | 5/1972 | Hermanson | 43/21.2 |
| 3,667,708 A * | 6/1972 | Smeltzer | 248/512 |
| 3,751,845 A | 8/1973 | Van Leeuwen | 43/56 |
| 4,403,483 A | 9/1983 | Lisalda | 62/457 |
| 4,845,881 A * | 7/1989 | Ward | 43/21.2 |
| 5,125,183 A * | 6/1992 | Tisdell | 43/54.1 |
| 5,131,179 A * | 7/1992 | McEwen | 43/21.2 |
| D328,775 S * | 8/1992 | Galante | D22/136 |
| 5,186,329 A | 2/1993 | Fogelberg | 206/372 |
| 5,261,561 A | 11/1993 | Hodges, Jr. | 220/735 |
| 5,271,520 A | 12/1993 | McAfee | 220/529 |
| 5,303,500 A * | 4/1994 | Luukonen | 43/54.1 |
| 5,305,542 A * | 4/1994 | Phelps | 43/21.2 |
| 5,319,877 A * | 6/1994 | Hagan | 43/54.1 |
| 5,331,761 A * | 7/1994 | Kuthy | 43/21.2 |
| 5,335,440 A * | 8/1994 | Williams | 43/21.2 |
| 5,350,065 A | 9/1994 | Darrey | 206/373 |
| 5,491,923 A * | 2/1996 | Zingrone | 43/17 |
| 5,634,291 A * | 6/1997 | Pham | 43/57 |
| D382,998 S | 9/1997 | Conigliaro | D3/313 |
| D384,391 S | 9/1997 | Bastian | D22/148 |
| 5,924,568 A | 7/1999 | Zajonc | 206/373 |
| 5,971,333 A * | 10/1999 | Fiedor | 248/129 |
| 6,135,467 A | 10/2000 | Tagariello | 280/79.5 |
| 6,209,721 B1 * | 4/2001 | Sharpe et al. | 206/315.6 |
| 6,253,484 B1 | 7/2001 | O'Connor | 43/21.2 |

(Continued)

FOREIGN PATENT DOCUMENTS

DE        3626574    *   2/1988

(Continued)

*Primary Examiner*—David J Parsley
(74) *Attorney, Agent, or Firm*—GrayRobinson, P.A.

(57) ABSTRACT

A fishing rod holder comprises a bucket having an open top end, a bottom wall and a side wall collectively forming a hollow interior which receives a number of tubes each secured at an upper end to a lid mounted to the open top of the bucket and at a lower end by a bolt or other fastener which extends from the side wall into each tube. The bottom wall of the bucket is formed with a drain hole, and mounts a number of rubber feet for stability which may be enhanced by the addition of a weight to the bottom wall.

4 Claims, 3 Drawing Sheets

U.S. PATENT DOCUMENTS

| | | | |
|---|---|---|---|
| 6,254,055 B1 | 7/2001 | Lamberson, Jr. | 248/538 |
| 6,364,150 B1 | 4/2002 | Persinger | 220/735 |
| 6,401,381 B1 * | 6/2002 | Broberg | 43/21.2 |
| 6,405,478 B1 * | 6/2002 | Westley | 43/54.1 |
| 6,550,629 B1 | 4/2003 | Pfister | 220/507 |
| 6,658,786 B1 | 12/2003 | Williams | 43/54.1 |
| 6,729,066 B1 * | 5/2004 | Howley | 43/54.1 |
| 6,883,268 B2 * | 4/2005 | Fraser | 43/54.1 |
| 2005/0252071 A1 * | 11/2005 | Urban | 43/21.2 |
| 2005/0257417 A1 * | 11/2005 | Black et al. | 43/21.2 |

FOREIGN PATENT DOCUMENTS

| | | | |
|---|---|---|---|
| FR | 2704725 | * | 11/1994 |
| JP | 6-303886 | * | 11/1994 |
| JP | 9-70311 | * | 3/1997 |
| JP | 10-262532 | * | 10/1998 |

* cited by examiner

FISHING ROD HOLDER

FIELD OF THE INVENTION

This invention relates to a fishing rod holder which supports and carries a number of saltwater or freshwater fishing rods in a secure fashion, and is particularly useful when fishing on a boat.

BACKGROUND OF THE INVENTION

Many fishing boats are equipped with one or more types of fishing rod holders to support saltwater or freshwater fishing rods when the boat is in transit or in use on the water. Depending on the design of the boat, the foredeck may include compartments with rod holders and there are often rod holders located along the port and/or starboard sides of the boat. If the boat has a console it may be provided with rod holders, and leaning posts or other seating arrangements on the boat typically include rod holders. Larger boats often have t-tops or the like which have rod holders as well.

All of the rod holders of the type described above are necessarily a fixture on the boat in the sense that they are not portable. Depending on the storage facility used by the boater, or the location where the boat is docked, it may be necessary to remove rods and other equipment from the boat when it is not in use to avoid theft. This presents the issue of how to conveniently and safely transport rods to and from the boat. It is not uncommon for a fisherman to rig and use a number of rods during a single day of fishing, and there may be two or more people fishing on the same boat. The boat owner and his or her guests need a convenient way of transporting their rods to and from the boat, and, in some cases, storing the rods while the boat is in use on a fishing trip.

This problem has been addressed to some extent in the prior art as shown, for example, in U.S. Pat. No. 6,364,150 to Persinger and U.S. Pat. No. 6,254,055 to Lamberson, Jr. The Persinger patent teaches an ice fishing bucket with a foam ring at the top formed with a number of slits, and a foam plate at the bottom having a number of holes. The fishing rods are placed in the interior of the bucket so that the end of the rod is received within a hole in the bottom plate, and a portion of the rod is captured within a slit in the foam ring to hold it in place. In the Lamberson, Jr. design, a bucket is provided with an insert having top and bottom plates connected by a number of vertical posts. The plates are formed with cut-outs within which the rods are held inside of the bucket.

Other patents disclose buckets having tubes or rings which support a fishing pole, such as disclosed in U.S. Pat. No. 6,658,786 to Williams, U.S. Pat. No. 3,603,019 to Smeltzer and D384,391 to Bastian. Additionally, U.S. Pat. No. 6,135,467 to Tagariello teaches a support stand for a bucket having a number of upstanding tubes which could support fishing poles, and U.S. Pat. No. 3,571,964 to Bogathy is directed to a bucket with holes formed on one side which support the bottom end of a pole while fishing.

SUMMARY OF THE INVENTION

This invention is directed to a fishing rod holder which comprises a bucket, preferably formed of plastic, having an open top end, a bottom wall and a side wall which collectively form a hollow interior. A lid is mounted to the open top of the bucket having a relatively large, central bore and a number of circumferentially spaced, outer holes located near the side wall of the bucket. A tube is inserted through each outer hole, and each tube is secured at the base of the bucket by a bolt or other fastener which extends from the side wall into the bottom end of each tube. The bottom wall of the bucket is formed with a drain hole, and mounts a number of rubber feet for stability of the bucket during use. Added stability may be provided by mounting a weight to the exterior surface of the bottom wall. A carrying handle is connected to the top end of the bucket for ease of transport.

A fishing rod may be inserted within each of the tubes, and each rod end extends downwardly into the bucket until it engages the bolt or other fastener located near the lower end of each tube. The fasteners are positioned to maintain the end of the fishing rod out of contact with the bottom of the bucket, and they also function as a rod stop to engage and prevent rotation of the rods within the tubes.

The fishing rod holder of this invention is compact, portable, inexpensive to manufacture and capable of securely supporting a number of fishing rods. Additionally, the provision of rubber legs, and optionally a weight along the bottom wall, provide stability to the rod holder to prevent it from tipping over. This is particularly advantageous when using the rod holder on a boat in rougher seas.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 1:
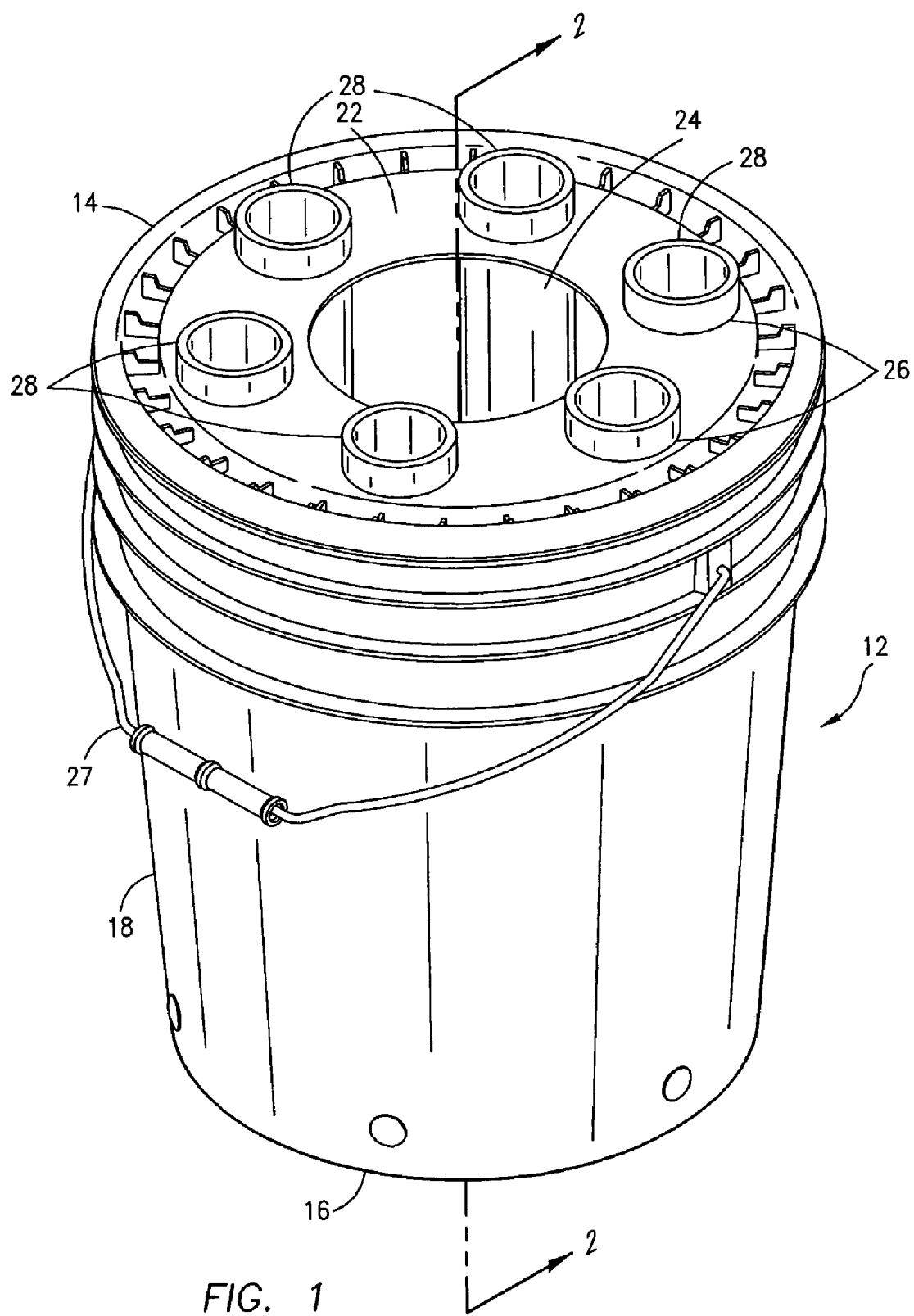
FIG. 1 is a perspective view of the rod holder of this invention in which a fishing rod is shown supported therein.

Referring now to the drawings, the fishing rod holder 10 of this invention comprises a housing in the form of a bucket 12 having a top end 14, and bottom wall 16 and a side wall 18 interconnected to define a hollow interior 20. An annular ring or lid 22 is mounted to the top end 14 of the bucket 10 having a central bore 24 and a number of circumferentially spaced outer holes 26 located near the side wall 18. Preferably, a handle 27 is connected to the bucket 12 at its top end 14 for ease of transport.

Figure 2:
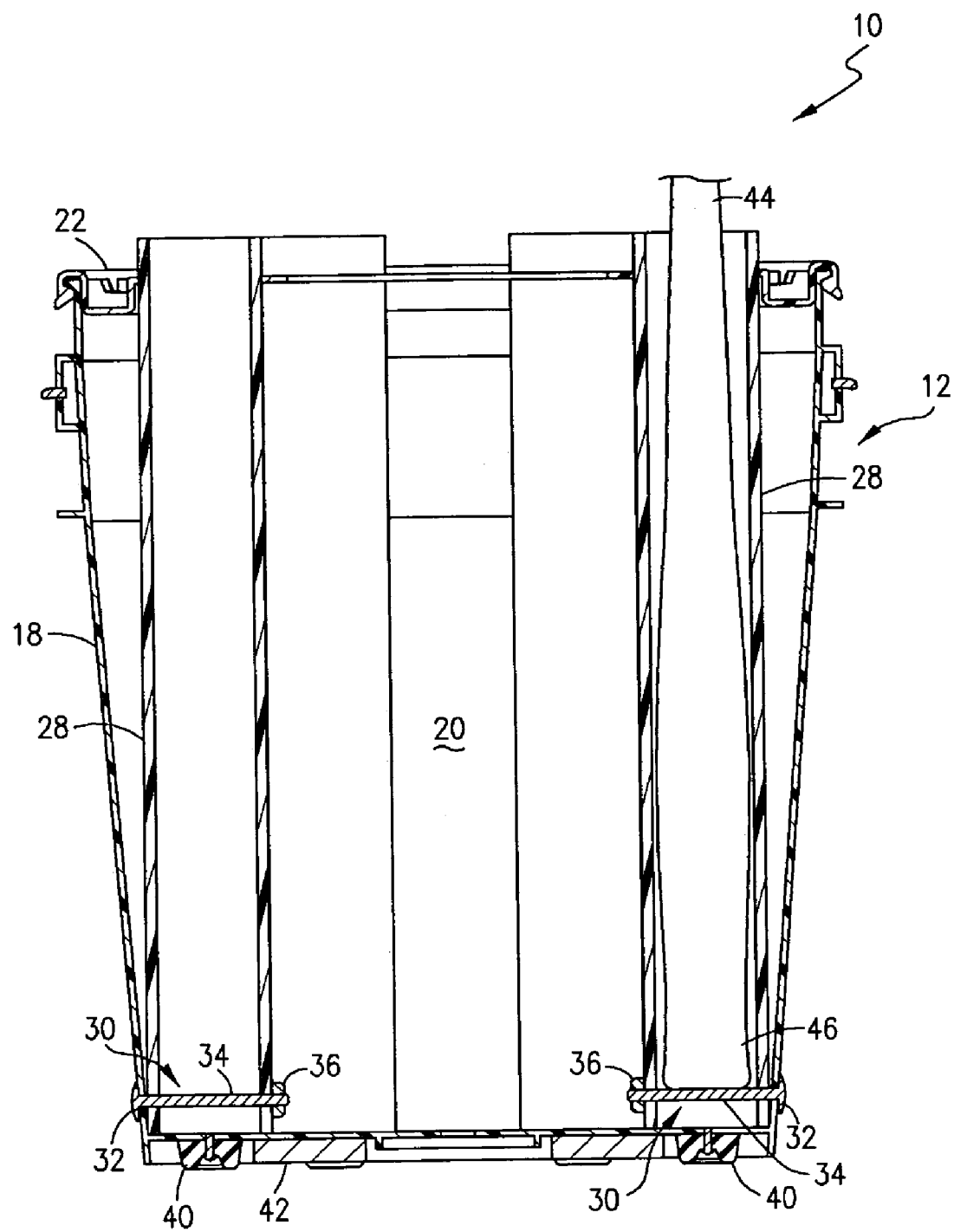
FIG. 2 is a cross sectional view of the rod holder herein taken generally along line 2-2 of FIG. 1.

In the presently preferred embodiment, an elongated cylinder or tube 28 is inserted through each of the outer holes 26 in the lid 22 into the hollow interior 20 of the bucket 12. The upper end of each tube 28 is affixed to the lid 22, and the lower end is mounted by a fastener such as a bolt 30 to the side wall 18 of the bucket 12. The upper end of each tube 28 may be glued or otherwise permanently affixed to the lid 22, or, alternatively, maintained in place by a friction fit. As best seen in FIG. 2, the head 32 of each bolt 30 is flush with the outer surface of the side wall 18 and its shank 34 extends completely through the lower end of a tube 28 and protrudes outwardly to receive a nut 36. The bucket 12, lid 22 and tubes 28 are all preferably formed of a rigid plastic material, such as PVC, although a non-corrosive metal or the like may also be employed.

Figure 3:
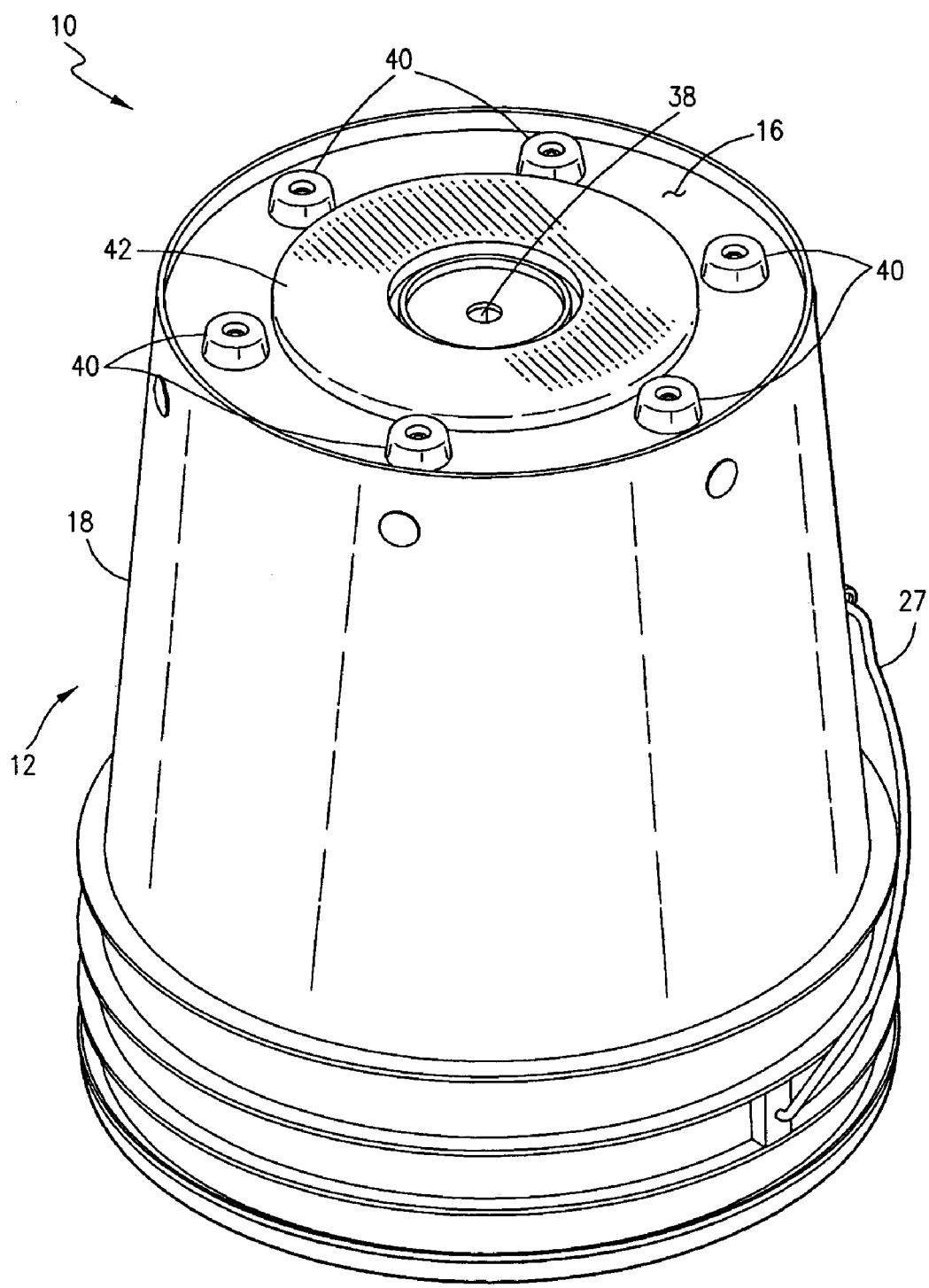
FIG. 3 is a bottom view of the rod holder of FIG. 1.

The bottom wall 16 of the bucket 12 has at least one drain hole 38, and its outer surface mounts a number of spaced feet 40 preferably formed of rubber. The rubber feet 40 provide stability to the bucket 12, particularly when in use on a boat, and such stability may be enhanced by mounting a weight 42 to the exterior surface of the bottom wall 16 as shown in FIG. 3. The weight 42 is depicted in the form of a ring in the figs., but it should be understood that essentially any other shape may be utilized and it may alternatively be mounted to the inner surface of the bottom wall 16 (not shown) instead of the outer surface.

Referring to FIG. 2, one end of a fishing rod 44 is inserted into a tube 28 and extends downwardly until the rod end 46 engages the bolt 30 which secures the lower end of the tube 28 within the bucket 12. The bolts 30 are spaced from the bottom wall 16 of the bucket 12 to keep the rod end 46 of each rod 44 away from such surface. Each bolt 30 also functions as a "rod stop" to contact and substantially prevent rotation of the rods 44 it contacts. This stabilizes the rods 44 within the interior of the bucket 12. The bucket 12 and rods 44 are easily carried to and from a boat or the like, and the bucket 12 is exceptionally stable, e.g. resists tipping over, even when used on a boat in relatively rough seas.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A fishing rod holder, comprising:
   a housing having an open top end, a bottom wall spaced from said top end and a side wall extending between said top end and said bottom wall forming a hollow interior;
   a lid fixed to said top end of said housing, said lid being formed with a central bore and a number of circumferentially spaced outer holes located adjacent to said side wall;
   a number of tubes each having an upper end, a lower end and a hollow interior, each of said tubes being inserted through one of said outer holes in said lid into said hollow interior of said housing, said upper end of each tube being connected to said lid; and
   a number of fasteners each extending from said side wall of said housing into engagement with said lower end of one of said tubes to mount said tubes in a fixed position within said housing, each of said fasteners extending through said hollow interior of one of said tubes at said lower end thereof to form a rod stop which engages and supports one end of a fishing rod.

2. The fishing rod holder of claim 1 in which said bottom wall of said housing is formed with a drain hole.

3. The fishing rod holder of claim 1 in which said bottom wall of said housing includes an inner surface located within said hollow interior and a spaced, outer surface, said fishing rod holder further including a weight attached to said outer surface of said bottom wall.

4. The fishing rod holder of claim 3 further including a number of spaced legs mounted to said outer surface of said bottom wall of said housing.

* * * * *